(12) United States Patent
Kothari et al.

(10) Patent No.: US 7,844,707 B2
(45) Date of Patent: Nov. 30, 2010

(54) WEB SERVICE MULTI-KEY RATE LIMITING METHOD AND SYSTEM

(75) Inventors: Pankaj Kothari, Bangalore (IN); Sidharta Seethana, Bangalore (IN); Amit Kumar, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 375 days.

(21) Appl. No.: 11/961,629

(22) Filed: Dec. 20, 2007

(65) Prior Publication Data

US 2009/0164632 A1 Jun. 25, 2009

(51) Int. Cl.
*G06F 15/16* (2006.01)
*G06F 21/00* (2006.01)

(52) U.S. Cl. .................. 709/225; 709/217; 709/218; 709/219; 709/223; 709/224; 709/244; 726/3

(58) Field of Classification Search ......... 709/217–219, 709/223–225, 244; 726/3
See application file for complete search history.

(56) References Cited

U.S. PATENT DOCUMENTS

| | | | | |
|---|---|---|---|---|
| 6,161,139 | A * | 12/2000 | Win et al. ................ | 709/225 |
| 7,161,904 | B2 * | 1/2007 | Hussain et al. ............ | 370/230 |
| 7,207,062 | B2 * | 4/2007 | Brustoloni ................ | 726/13 |
| 7,215,637 | B1 * | 5/2007 | Ferguson et al. ......... | 370/230.1 |
| 7,400,580 | B1 * | 7/2008 | Synnestvedt et al. ..... | 370/230 |
| 7,448,048 | B1 * | 11/2008 | Nesamoney et al. ...... | 719/318 |
| 7,590,716 | B2 * | 9/2009 | Sinclair et al. ............ | 709/223 |
| 2003/0051064 | A1 * | 3/2003 | Curtis ..................... | 709/313 |
| 2003/0182423 | A1 * | 9/2003 | Shafir et al. .............. | 709/225 |
| 2005/0198200 | A1 * | 9/2005 | Subramanian et al. ..... | 709/218 |
| 2006/0036720 | A1 * | 2/2006 | Faulk ..................... | 709/223 |
| 2006/0126518 | A1 * | 6/2006 | Lee et al. ................. | 370/244 |
| 2007/0121596 | A1 * | 5/2007 | Kurapati et al. .......... | 370/356 |
| 2008/0002652 | A1 * | 1/2008 | Gupta et al. .............. | 370/338 |
| 2008/0008090 | A1 * | 1/2008 | Gilfix ..................... | 370/230 |
| 2008/0008095 | A1 * | 1/2008 | Gilfix ..................... | 370/235 |
| 2008/0022289 | A1 * | 1/2008 | Curtis ..................... | 719/313 |
| 2008/0154796 | A1 * | 6/2008 | Pallister et al. ........... | 705/36 R |
| 2008/0209451 | A1 * | 8/2008 | Michels et al. ............ | 719/328 |
| 2008/0215749 | A1 * | 9/2008 | Bala et al. ................ | 709/233 |
| 2008/0219170 | A1 * | 9/2008 | Marcellin ................ | 370/238.1 |
| 2009/0106821 | A1 * | 4/2009 | Kothari et al. ............ | 726/3 |
| 2009/0225759 | A1 * | 9/2009 | Hussain et al. ........... | 370/395.1 |
| 2010/0036951 | A1 * | 2/2010 | Kamath et al. ........... | 709/225 |

* cited by examiner

*Primary Examiner*—Alina N. Boutah
(74) *Attorney, Agent, or Firm*—Seth H. Ostrow; Ostrow Kaufman LLP

(57) ABSTRACT

The present invention provides a method and computer system for limiting a number of web service programming calls including intercepting a web request for web service programming from a client and extracting call specific data from the web request. The method and computing system further includes transmitting call specific data to a plurality of rate limiter servers and on the rate limiter servers, calculating a total number of web requests, where the web requests are identified by the call specific data. The method and computing system further includes receiving web request totals from the rate limiter servers and thereby determining accessibility of the client to the web request based on a comparison of the number of web requests for the web service programming relative to a predetermined access limit.

15 Claims, 7 Drawing Sheets

WEB SERVICE MULTI-KEY RATE LIMITING METHOD AND SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to limiting web service activities and more specifically using multi-key rate limiting to limit web service activities in accordance with predefined usage guidelines.

BACKGROUND OF THE INVENTION

Internet or network based processing has greatly evolved and includes many aspects of network-based applications and services. Commonly referred to as web services, these network-based applications offer many processing and computing advantages in the networked environment. Concurrent with the growth of web services has been the corresponding demand, as well as the infrastructure to support these network-based activities. Internet-based programs, such as Mails, Maps, can provide these web services and many times these web services can be directly tied into web-based transactions.

As with managed growth, bandwidth and processing power can dictate many terms of the web service, not only how the web service itself operates, but also the ability for the corresponding infrastructure to support these web services themselves. For example, it is common for web service applications to be hosted or connected with a hosting platform that provides the web service or provides corresponding access to these services. Often times, the web traffic volume, and possibly also the corresponding processing or computational overhead, can be dictated by service level agreements (SLAs) or other agreements between the parties. For example, a hosting entity may host the web service for users in return for payment terms.

Existing systems have been developed with the goal of facilitating the connection and execution of the web service, and the underlying applications. These systems have overlooked restrictive conditions to better manage the web service hosting environment. The host processing environment needs to manage bandwidth and processing power.

A common approach for solving issues with bandwidth and processing for web services include providing additional bandwidth and processing power. Prior techniques include receiving web requests and adaptively assigning the web requests to different processing computers, such as using a random probability number for the web request and this random number being used to thereby distribute the request to one of a number of corresponding web servers. Economically, it can be important to track, prevent overuse or otherwise coordinate costs associated with these aspects relative to the service agreements. As such, there exists a need for a technique to limit a number of web service programming calls, such as in accordance with an SLA.

SUMMARY OF THE INVENTION

Generally, the present invention provides a method and computer system for limiting a number of web service programming calls including intercepting a web request for web service programming from a client and extracting call specific data from the web request. The method and computing system further includes transmitting call specific data to a plurality of rate limiter servers and on the rate limiter servers, calculating a total number of web requests, where the web requests are identified by the call specific data. The method and computing system further includes receiving web request totals from the rate limiter servers and thereby determining accessibility of the client to the web request based on a comparison of the number of web requests for the web service programming relative to a predetermined access limit.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration exemplary embodiments in which the invention may be practiced. It is to be understood that other embodiments may be utilized and structural changes may be made without departing from the scope of the present invention.

Figure 1:
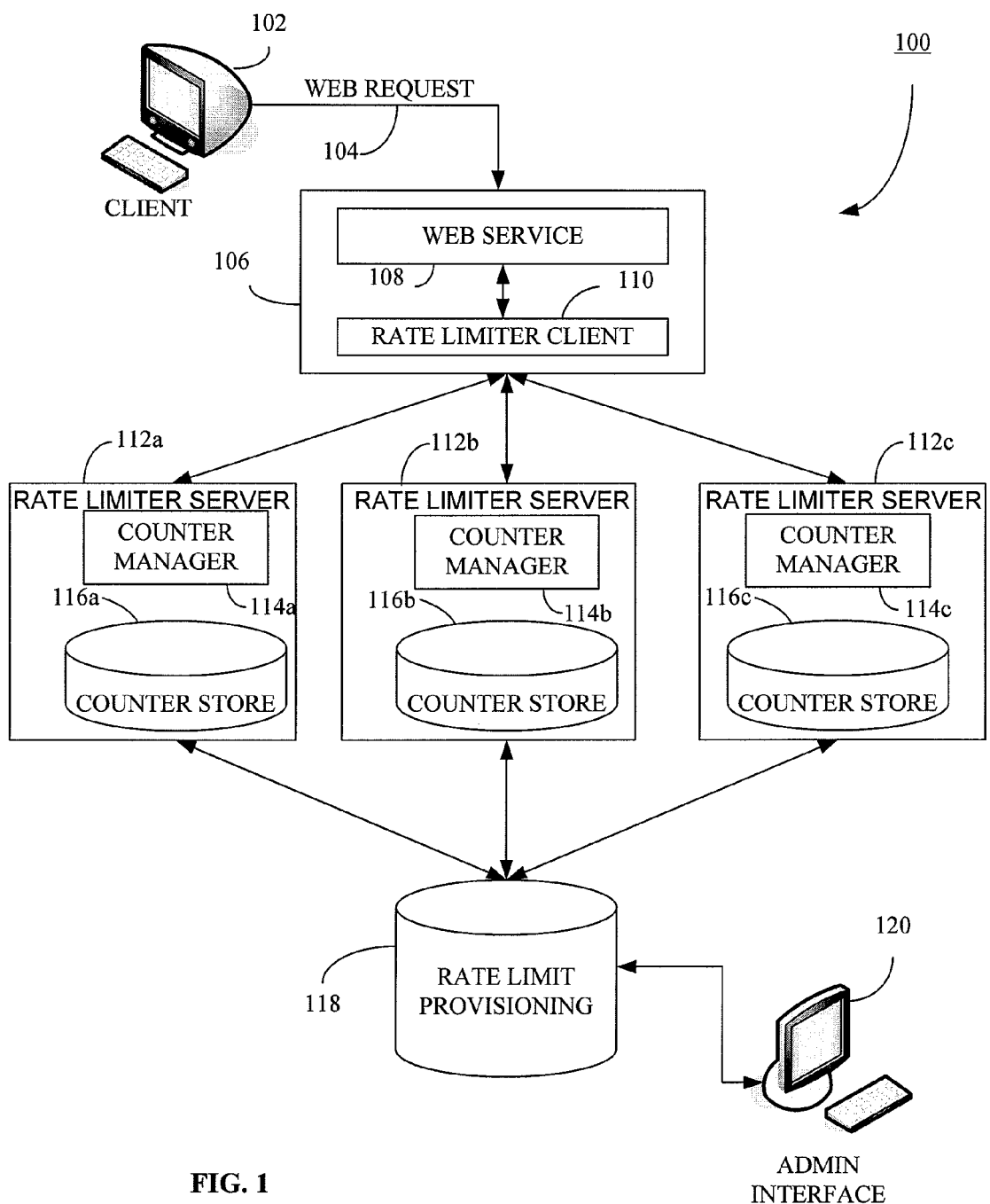
FIG. 1 illustrates a block diagram of one embodiment of a computing system including a system for limiting a number of web service programming calls.

FIG. 1 illustrates one embodiment of a computing environment or computing system that includes a system for limiting a number of web service programming calls. The system 100 includes a client device 102, which generates a web request 104 to a network device 106 that includes a web service module 108 and a rate limiter client 110.

The system 100 further includes a plurality of rate limiter servers 112a, 112b and 112c (generally referred to by reference number 112). The rate limiter servers 112 include a counter manager 114a, 114b and 114c (generally referred to by reference number 114) and a counter store 116a, 116b and 116c (generally referred to by reference number 116).

FIG. 1 illustrates three rate limiter servers, but it is recognized that any suitable number of rate limiters servers may be utilized in the system 100. The system 100 further includes a rate limit provisioning database 118 and an administrative interface computing device 120.

The client device 102 may be any suitable computing device or software application operative to generate and provide the web request 104. The client device 102 is network connected, such across an Internet-based connection for providing the web request 104 to the network device 106. It is recognized that there may exist various processing devices and intermediate processing devices or components for transmitting the web request 104 via the networked connection, such as routing devices for example, wherein these known elements are omitted from description herein for brevity purposes only.

The web request 104 may be any suitable type of web request that includes a request for a web service, such as a request to call a particular application. The web request 104 includes call specific data that is usable by the web service module 108 in performing the requested web service, such as a key. The key or web request data of the web request 104 may include coded information, such as a client identifier, an application identifier, a client Internet Protocol (IP) address and/or other information or call specific metadata as recognized by one skilled in the art.

The network device 106 includes the web service module 108 and the rate limiter client 110 and may contain further additional processing components used for network-based communication as recognized by one skilled in the art. The web service itself that is run by the web service module 108 may be a SOAP, REST or any other type of service accessible programmatically over the Internet or within an intranet, wherein the web service module 108 may also include the rate limiting functionality described herein. The web service client 108 may be any application program or module that uses the above service and is uniquely identifiable with a set of identification meta data.

The rate limiter client 110 is illustrated as a separate processing component in the network device 106, but it is recognized that one embodiment may include the rate limiter client 110 being embedded within executable instructions in the web service 108, or may be a separate processing routine or processing device operative to provide the operations described herein.

The rate limiter server 112 may be disposed at any suitable location and in communication with the network device 106 using any suitable communication technique. For example, the server 112 may be local to the device 106 using an internal communication or in another embodiment may be in communication across a networked connection (e.g, Internet or intranet) using network connection protocols as recognized by one skilled in the art. The counter manager 114 may be a processing device in response to executable instructions for performing web service counting operations, as well as other related processing operations, as described in further detail below.

The counter store 116 and the rate limit provisioning 118 may be any suitable type of storage devices capable of storing counter information in the counter store 116 and rate limit information in the provisioning database 118. The counter store 116 is illustrated as being disposed in the rate limiter server 112, but it is recognized that this data storage device 116 may be stored at any suitable location. Similarly, the rate limit provisioning storage device 118 can be stored in any suitably accessible location, such as on an administrative processing system in operative communication with the rate limiter server 112 across a networked connection using any suitable networking communication techniques.

The administrative interface 120 may be a computing application executable on one or more processing device whereby an administrator (not expressly shown) is operative to interact with the rate limit provisioning database 118. For example, the administrative interface 120 may include software applications for allowing the administrator to input SLA terms relating to the rate limits for various web services, as described in further detail below.

Figure 2:
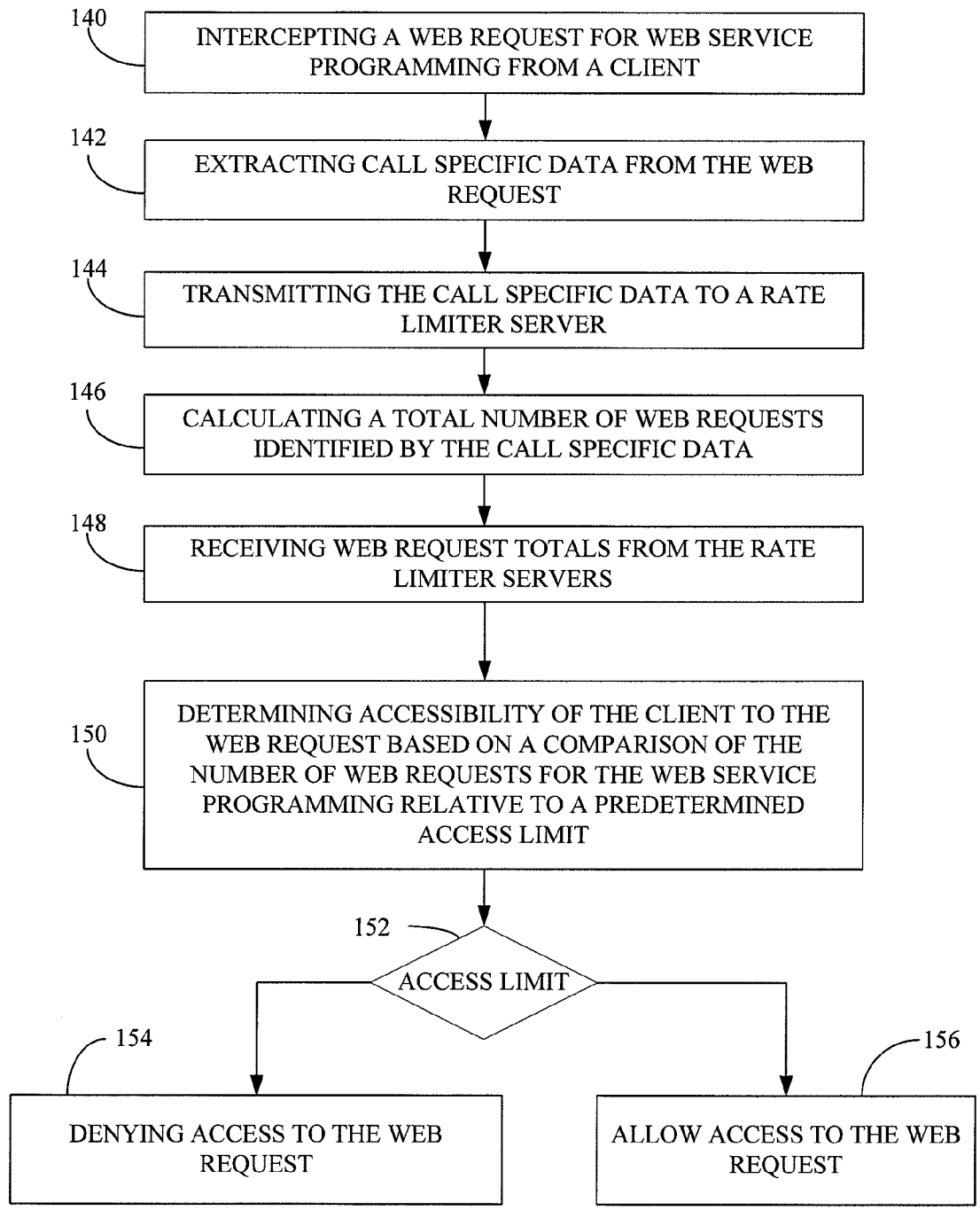
FIG. 2 illustrates a flowchart of the steps of one embodiment of a method for limiting a number of web service programming calls.

FIG. 1 illustrates one embodiment of the computing system 100 and FIG. 2 illustrates the method steps as may be performed by the system 100. The flowchart of FIG. 2 is described herein with respect to description of the system of FIG. 1.

In the method for limiting a number of web service programming calls, a first step, step 140, is intercepting a web request for web service programming from a client. With respect to FIG. 1, this includes intercepting the web request 104, the intercepting performed by the rate limiter client 110.

In one embodiment, prior to the receipt of the web request, the system 100 may include provisioning details defining allowances for the web requests, such as with respect to an SLA. The provisioning may a global provisioning wherein global prioritization is set up to determine which key to limit on when multiple keys are supplied in a request, as described further below. The provisioning may include information stored in the rate limit provisioning database 118, such as received via the user or admin interface 120.

A next step, step 142, includes extracting call specific data from the web request. This step may be performed by the rate limiter client 110. As described above, the call specific data may include any suitable type of data relating to the web service call, including data that identifies the web service request 104 and/or the requesting entity, such as the client 102.

In one embodiment, not explicitly denoted in the flowchart of FIG. 2, the rate limiter client 110 may also take a hash of the individual keys, call specific data. This hashing may utilize any suitable hashing routine, wherein the hashed keys are therein compared to a transport reference table that indicates which of the various rate limiter servers to transmit the call specific data. One embodiment includes the designation of multiple rate limiter servers for fault tolerance purposes.

Therefore, a next step, step 144, includes transmitting the call specific data to the designated rate limiter servers. With respect to FIG. 1, the rate limiter client 110 may thereby transmit the call specific data to rate limiter servers 112*a*, 112*b* and/or 112*c*. The transmission may include additional routing information and security information, if needed. Moreover, with the redundancy aspects of selecting multiple rate limiter servers, the rate limiter client 110 may include additional functionality to insure subsequent processing by the designated rate limiter servers 112 or otherwise execute additional processing operations to overcome networking or processing inefficiencies, as described further below.

The next step, step 146, includes calculating a total number of web requests as identified by the call specific data. This step may be performed the rate limiter servers 112 of FIG. 1, wherein the counter manager 114 receives the call specific data, determines for which web service the call specific data relates and then interfaces with the counter store 116 for a total number of web service calls or requests attributed to the web service 108. The counter store 116 includes an existing counter value for the web service, whereupon the counter manager 114 may thereupon determine a cumulative total of web service requests, such as within a defined period of time. For example, a number of previous web service requests may have been received in the last time interval and the counter store 116 stores this value, whereby the new web service request is then added to this total.

This step may also include, in another embodiment, prioritization of the web request and the examination of priority data in the provisioning information. Keys may include priority information, therefore this step may include determining the prioritization order for the keys supplied and deciding enforcement decisions based on the keys having higher or highest priorities. For example, if the limit for a higher priority key is exhausted, then the server can automatically fall back to enforce limiting based on a key with a lower priority. Moreover, in one embodiment, priority works only for provisioned keys.

The next step, step 148, includes receiving web request totals from the rate limiter servers. With respect to FIG. 1, the rate limiter client 110 receives the web request totals from the rate limiter servers 112. In a fault tolerant embodiment, the rate limiter client 110 may delay any further steps with respect to the web request 104 until receiving replies from all of the rate limiter servers 112. As described above, the rate limiter client 110 may transmit the call specific data to more then one rate limiter server 112, and therefore fault tolerance measures can include requiring the rate limiter client 110 to receive all replies prior to making the determination to thereby insure the veracity of the web request totals.

In another embodiment, the fault tolerance aspects of the system 100 can provide for a failure in communication between the rate limiter client 110 and the network limiter server 112. In this embodiment, if a connection goes down between the client 110 and server 112 after a request has been made or if the connection fails prior to sending a key to a designated node, the rate limiter client may include programming to offset this failure in communication. For example, the rate limiter client 110 may re-assign the partition (network limiter 112) for a valid connection.

In the method of FIG. 2, the next step, step 150 of this embodiment includes, determining accessibility of the client to the web request based on a comparison of the number of web requests for the web service programming relative to a predetermined access limit.

The determination of accessibility may thereupon be determined based on a comparison of the number or volume of web service requests relative to defined limits, such as limits defined by a SLA between a company that provides web service to its customers and the hosting company that provides the servers for performing the web service functionality.

Step 152 is a determination if the counter manager value, based on the combination of the new web service request and the counter store value, exceeds an access limit. If the number or volume of web service requests is above the access limit, the method includes step 154, denying access to the web request. Whereby, if the number of volume of web service requests is below the access limit, the method includes step 156, allowing access to the web request.

With respect to FIG. 1, the rate limiter client 110 on the network device 106 may make the allowance or denial determination. The rate limiter client 110 may thereby allow the network device 106 to perform the web service 108 or if denied, may deny the web service request or could, in another embodiment, send a denial of service or other type of notification to the client 102.

Thereby, through the steps of the flowchart of FIG. 2, the system 100 of FIG. 1 is operative to limit a number of web service calls, in accordance with one embodiment of the present invention. The system 100 may also execute additional embodiments to limit the number of web service calls, including for example performing additional processing operations in the rate limit client 110 or the rate limiter server 112. For example, one embodiment may include executing a hashing algorithm using the key data extracted from the web request.

In another embodiment, the rate limiter client 110 may perform a roll-up operation based on multiple keys. In the roll-up embodiment, rate limiting is performed based on a grouping of keys, as well as on the individual keys. In this embodiment, the server 112 inspects every request key to determine whether it is a rollup key or a normal key. If it is a normal key, limit provisioning as described above can be performed. If the key is a roll-up key, the server may aggregate the request against the key to which it rolls up and then do the limiting.

Attached hereto in the Appendix as exemplary source code algorithms for operations described herein. The operations of the source code are also generally reflected in the flowcharts of FIGS. 3-7 described below. The source code of the Appendix also includes variable definitions as used in the description below and the accompanying figures. For terminology purposes, the partitions as described herein can be equivalent to the rate limiter servers 112 described above.

Figure 3:
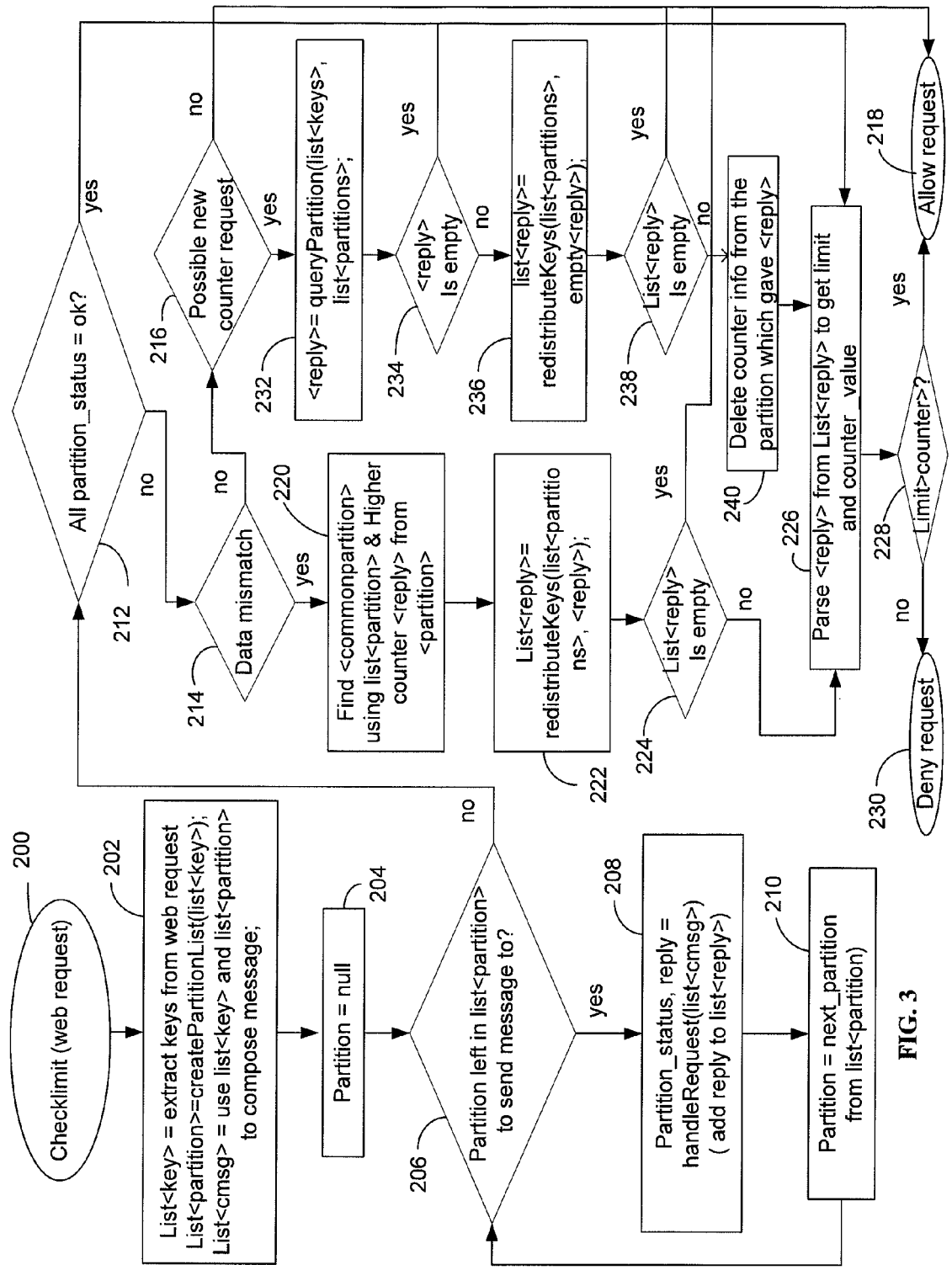
FIG. 3 illustrates a flowchart of the steps of a programming checklimit module for limiting a number of web service programming calls.

FIG. 3 illustrates an algorithmic flowchart of the computing or processing steps relating to a checklimit operation, which may be performed by the processing system 100 of FIG. 1, for example. The flowchart of FIG. 3 illustrates an exemplary embodiment and it is recognized that additional embodiments are herein envisioned, as recognized by skilled in the art.

A first step, step 200, is a checklimit(web request) call command in response to the web service request, typically received from a client device. A next step, step 202, is to generate various fields, such as List<key>, List<partition>, and List<cmsg>, wherein List<key> is based on extracted keys from the web request, List<partition> is based on the called function createPartitionList(list<key>) and the List<cmsg> used list<key> and list<partition> to compose a message, which is subsequently sent to the rate limiter clients.

A next step, step 204, is to define partition as a null value. Thereby, in decision step 206, a determination is made if a partition is left in list<partition> to which send messages. If the answer is in the affirmative, step 208 includes updating the partition status and step 210 is to update the partition to the next value in the list, and reverting back to determination step 206.

If the answer to the inquiry of step 206 is in the negative, a next decision query 212 is if all partition_status equal ok. If no, inquiry step 214 is to determine if there is a data mismatch. If no, inquiry step 216 is to determine if there is a new counter request. If the yes to step 216, a next step is to allow the request, step 218.

Referring back to step 214, the data mismatch inquiry, if the data is mismatched, a next step 220 is to find a common partition using list<partition> and higher counter<reply> from <partition>. A next step 222, includes defining list<reply> as being equal to redistributeKeys (list<partitions>,<reply>).

Inquiry step 224 determines if the list<reply> is empty. If no, step 226 is to parse <reply> from List<reply> to get limit and counter_value. In inquiry step 228, a determination is made if the limit is greater then the counter value. If no, which means that the number of allowed requests has been exceeded, the request is denied, step 230. If yes, indicating that the maximum number of requests has not been reached, step 218 allows the request.

Reverting back to the inquiry of step 216, if the determination is that there is a new counter request, the method proceeds to step 232, wherein <reply> is equal to queryPartition(list<keys>, list<partitions>). In step 234, if the <reply> is empty, the method proceeds to step 226, but if the answer is in the negative, step 236 includes definining list<reply> as being equal to redistributeKeys(list<partitions>, empty<reply>).

In step 238, another determination is made if list<reply> is empty. If yes, the method proceeds to step 218 to allow the request. If the answer is in the negative, the next step 240 includes to delete counter information from the partition which gave <reply>. Thereupon, the method proceeds to step 226, as described above.

Figure 4:
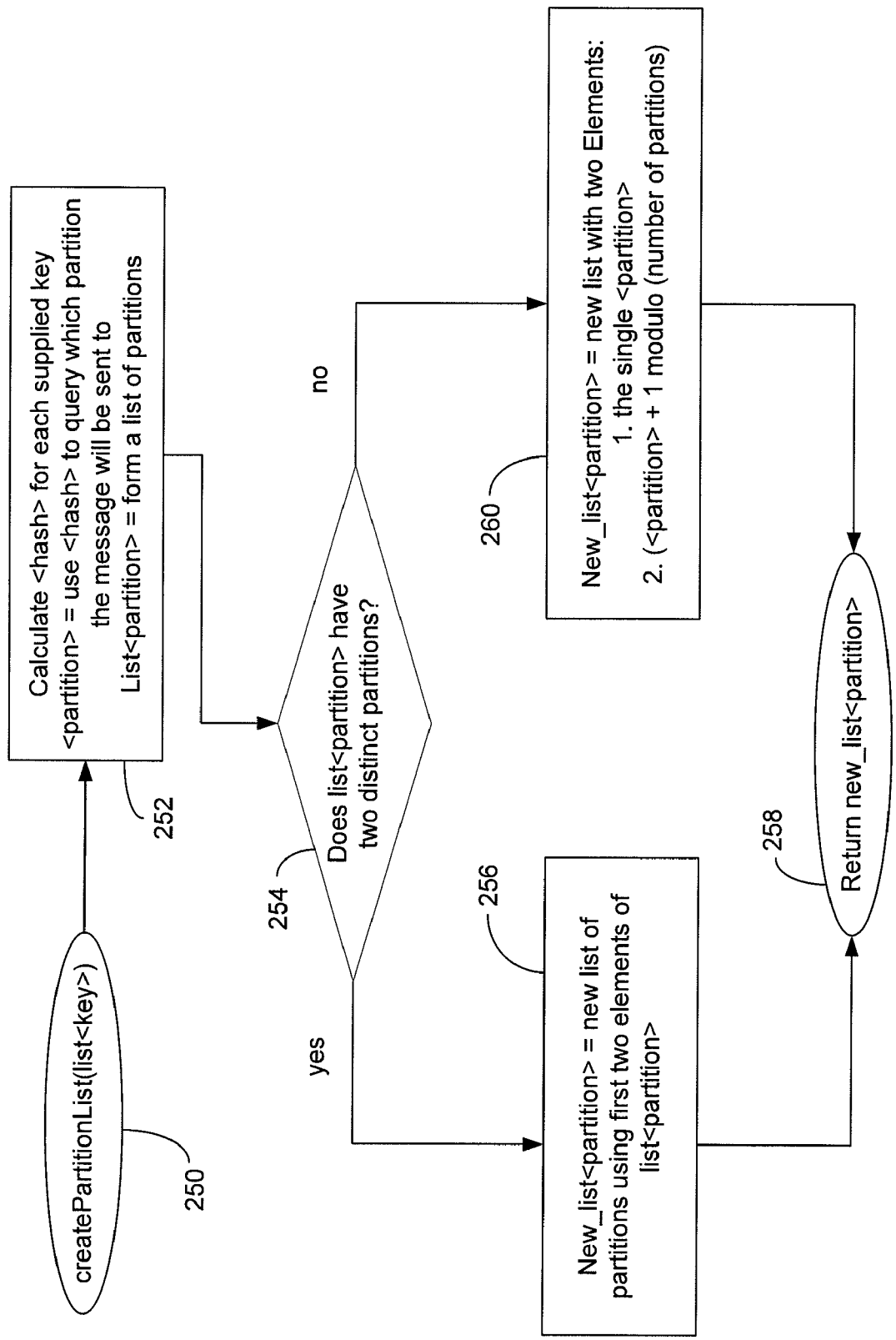
FIGS. 4-6 illustrate flowcharts of the steps of programming modules of different embodiments of methods for limiting a number of web service programming calls, as may be performed by a rate limiter client.

FIG. 4 illustrates a flowchart of the a programming algorithm which may be performed by processing devices on the network device 106 of FIG. 1, wherein the algorithm provides for generating partition lists usable for distributing key values to rate limiter servers 112. A first step 250 is to create a partition list based on the list defined by the key. Thereupon, step 252 is to calculate a hash value for each supplied key, define a partition value based on the hash to query which partition the message will be sent and the list<partition> value defines a list of partitions, or rate limiter servers.

Inquiry step 254 determines if the list<partition> has two distinct partitions. If yes, step 256 defines a new list of partitions as a new list of partitions using the first two elements of list<partition>. Step 258 is to return the new list of partition values (new_list<partition>). If the answer in step 254 is no, the next step is to define a new list of partitions with two elements where a first element is the duplicate <partition> in the list a second element is duplicate <partition> plus a one modulo number of partitions. Thereupon, the methodology reverts again to step 258 to return the new list of partition values.

Figure 5:
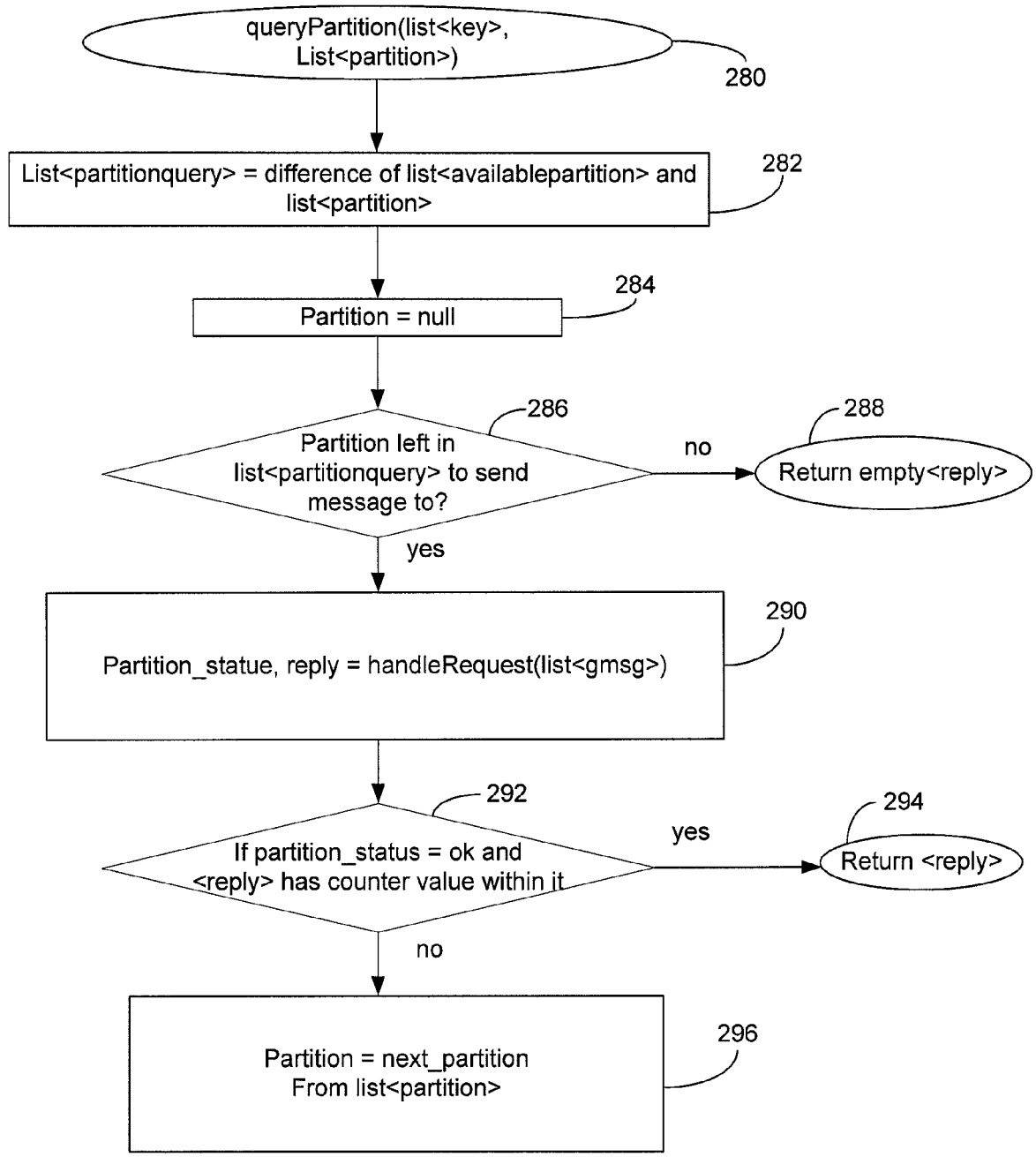

FIG. 5 illustrates a flowchart of the a programming algorithm which may be performed by processing devices on the network device 106 of FIG. 1, wherein the algorithm provides for generating partition lists usable for distributing key values to rate limiter servers 112. Step 280 is the command to query partition based on a list<key> and a list<partition> value. Step 282 defines the list<partitionquery> value as being equal to difference of list<availablepartition> and list<partition> values. Step 284 defines the partition as null.

Inquiry step 286 determines if the partition left in list<partitionquery> to send messages to. If no, meaning all messages including the hashed keys, have been transmitted, step 288 is to return an empty<reply>. If the response to step 286 is yes, step 290 is to define partition_status, reply as being equal to handleRequest(list<gmsg>).

Inquiry step 292 determines if partition status is ok and the reply has a counter value in it. If yes, step 294 is to return <reply> and if no, step 296 is to define partition as the next partition from the list of partitions.

Figure 6:
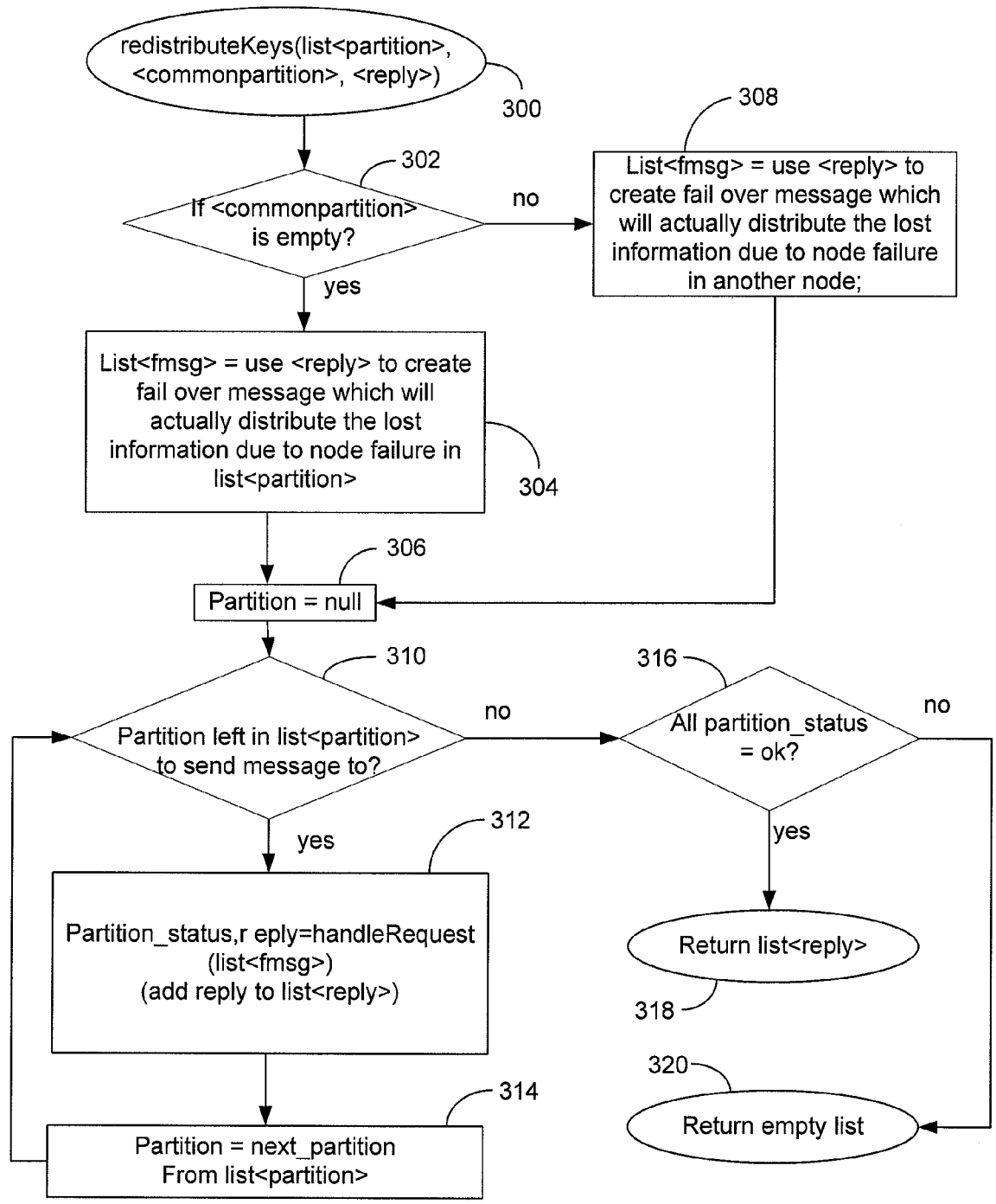

FIG. 6 illustrates a flowchart of the a programming algorithm which may be performed by processing devices on the network device 106 of FIG. 1, wherein the algorithm provides for generating partition lists usable for distributing key values to rate limiter servers 112. A first step, 300, is a redistributeKeys command including modifiers of list<partition>, <commonpartition>, <reply>). Inquiry step 302 determines if <commonpartition> is empty. If yes, step 304 is to define list<fmsg> using <reply> to create a fail over message which will actually distribute the lost information due to node failure in list<partition>. Thereupon, step 306 defining partition as null.

If the inquiry of step 308 is in the negative, step 308 is to define list <fmsg> using <reply> to create fail over message which will actually distribute the lost information due to node failure in another node. Thereupon, the algorithm continues to step 306 described above.

From step 306, inquiry step 310 determines if the are any partitions left in list<partition> to send a message to. If yes, step 312 is to update partition status and define the reply based on the handleRequest (list<fmsg>) and add reply to the list<reply>. Step 314 includes incrementing to the next partition in the list.

If the answer to step 310 is no, meaning that all messages have been sent to corresponding partitions, step 316 is in the inquiry if the all_partition status is ok. If yes, step 318 includes returning list<reply> and if the answer no, step 320 returns empty list.

Figure 7:
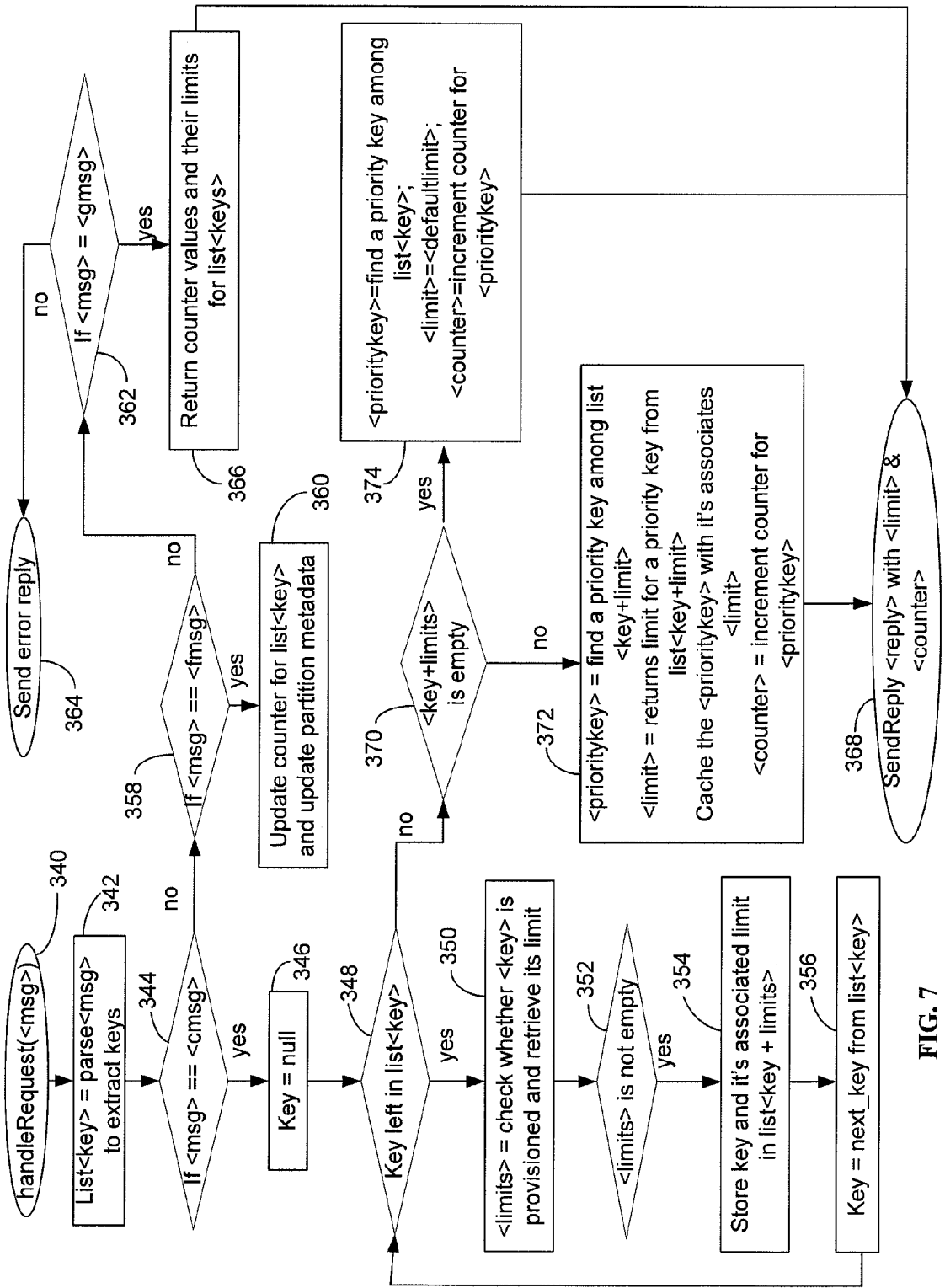
FIG. 7 illustrates the flowchart of the steps of a programming module for limiting a number of web service programming calls, as performed by the rate limiter server.

FIG. 7 illustrates a flowchart of a programming algorithm, which may be performed by processing devices on the rate limiter server, wherein the algorithm provides for a response to the hashed key message from the rate limiter client 110. A first step is receipt of a handle request include the message, step 340. Step 342 is to parse the message to extract the keys. Step 344 determines if <msg> is equal to <cmsg>. If yes, step 346 defines the key as a null value.

Step 348 determines if there is a key left in the key list. If yes, step 350 determines whether the key is provisioned and retrieves the limits value. In step 352, if the limit is not empty, step 354 includes storing key and its associated limit in a list of keys and its limits. Step 356 is the iterative step to increment the key value, whereupon the method reverts back to step 348.

Reverting back to step 344, if the message is not equal to <cmsg>, step 358 determines if <msg> is equal to <fmsg>. If yes, step 360 includes updating the counter for list<key> and update partition metadata. If no, step 362 is a determination if <msg> is equal to <gmsg>. If no, step 364 includes sending an error reply. If yes, step 366 is to return counter values and their limits for the list of keys. Step 368 thereby includes sending reply that includes limit and counter values.

Reverting back to step 348, if there are no keys left in the list, the next step 370 is to determine if the key plus limits are an empty set. If no, step 372 includes finding a priority key among a list of key and limits, defining a limit for a priority key from the list<key+limit>, cache the <prioritykey> with its associated <limit> and increment the counter value for the priority key value. Thereupon, the method continues to step 368 to send the reply including limit and counter values.

If the inquiry to step 370 is in the affirmative, step 374 defines the prioritykey value based on a priority key among the list of key values, define the limit as a default limit and increment the counter for the priority key. Thereupon, the method continues to step 368 as described above.

FIGS. 1 through 7 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms memory and/or storage device may be used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for limiting a number of web service programming calls, the method comprising:
   intercepting a web request for web service programming from a client;
   extracting call specific data from the web request, wherein the web request includes at least one of: a client identifier, an application identifier and a client IP address;
   generating a plurality of hashes from the call specific data;
   accessing a transport module to determine which of the plurality of rate limiter servers to send the hashes;
   transmitting the hashes to a plurality of rate limiter servers;
   on the rate limiter servers, calculating a total number of web requests, identified by the hashes;
   receiving web request totals from the rate limiter servers; and
   determining accessibility of the client to the web request based on a comparison of the number of web requests for the web service programming relative to a predetermined access limit.

2. The method of claim 1 wherein the determination of accessibility includes denying access if the number of web requests exceeds the predefined limit.

3. The method of claim 1 further comprising:
   determining a priority designation of the web request, wherein the accessibility of the client to the web request is also based on the priority designation.

4. The method of claim 1 wherein the accessibility determination is predicated on receipt the web request totals from the rate limiter servers.

5. The method of claim 4 further comprising:
   re-assigning rate limiter server assignments if a connection is disrupted between the plurality of rate limiter server.

6. Computer non-transitory readable media comprising program code that when executed by a programmable processor causes the processor to execute a method for limiting a number of web service programming calls, the computer readable media comprising:
   program code for intercepting a web request for web service programming from a client;
   program code for extracting call specific data from the web request, wherein the web request includes at least one of: a client identifier, an application identifier and a client IP address;
   program code for generating a plurality the call specific data;
   accessing a transport module to determine which of the plurality of rate limiter servers to send the hashes;
   program code for transmitting the hashes to a plurality of rate limiter servers;
   on the rate limiter servers, program code for calculating a total number of web requests, identified by the hashes;
   program code for receiving web request totals from the rate limiter servers; and
   program code for determining accessibility of the client to the web request based on a comparison of the number of web requests for the web service programming relative to a predetermined access limit.

7. The non-transitory computer readable media of claim 6 wherein the determination of accessibility includes denying access if the number of web requests exceeds the predefined limit.

8. The non-transitory computer readable media of claim 6 further comprising:
   program code for determining a priority designation of the web request, wherein the accessibility of the client to the web request is also based on the priority designation.

9. The non-transitory computer readable media of claim 6 wherein the accessibility determination is predicated on receipt the web request totals from the rate limiter servers.

10. The non-transitory computer readable media of claim 9 further comprising:
    program code for re-assigning rate limiter server assignments if a connection is disrupted between the plurality of rate limiter server.

11. An apparatus for limiting a number of web service programming calls, the apparatus comprising:
- a memory device having executable instructions stored therein; and
- a processing device, in response to the executable instructions, operative to:
  - intercept a web request for web service programming from a client;
  - extract call specific data from the web request, wherein the web request includes at least one of: a client identifier, an application identifier and a client IP address;
  - generate a plurality of hashes from the call specific data;
  - access a transport module to determine which of the plurality of rate limiter servers to send the hashes;
  - transmit the hashes to a plurality of rate limiter servers;
  - on the rate limiter servers, calculate a total number of web requests, identified by the hashes;
  - receive web request totals from the rate limiter servers; and
  - determine accessibility of the client to the web request based on a comparison of the number of web requests for the web service programming relative to a predetermined access limit.

12. The apparatus of claim 11 wherein the determination of accessibility includes denying access if the number of web requests exceeds the predefined limit.

13. The apparatus of claim 11, the processing device, in response to the executable instructions, further operative to:
- determine a priority designation of the web request, wherein the accessibility of the client to the web request is also based on the priority designation.

14. The apparatus of claim 11 wherein the accessibility determination is predicated on receipt the web request totals from the rate limiter servers.

15. The apparatus of claim 14, the processing device, in response to the executable instructions, further operative to:
- re-assign rate limiter server assignments if a connection is disrupted between the plurality of rate limiter server.

* * * * *